US012782872B2

(12) United States Patent
Moille et al.

(10) Patent No.: US 12,782,872 B2
(45) Date of Patent: Nov. 3, 2026

(54) TIMEPIECE DRIVING DEVICE

(71) Applicant: ROLEX SA, Geneva (CH)

(72) Inventors: Daniel Moille, Yvoire (FR); Ramis Schiegg, Männedorf (CH)

(73) Assignee: ROLEX SA, Geneva (CH)

( * ) Notice: Subject to any disclaimer, the term of this patent is extended or adjusted under 35 U.S.C. 154(b) by 230 days.

(21) Appl. No.: 18/821,696

(22) Filed: Aug. 30, 2024

(65) Prior Publication Data

US 2025/0076814 A1 Mar. 6, 2025

(30) Foreign Application Priority Data

Sep. 1, 2023 (EP) .................................... 23194760

(51) Int. Cl.
*G04B 19/253* (2006.01)
*G04B 27/02* (2006.01)

(52) U.S. Cl.
CPC ..... *G04B 19/25373* (2013.01); *G04B 27/026* (2013.01)

(58) Field of Classification Search
CPC ...... G04B 19/24; G04B 19/25; G04B 19/253; G04B 19/25373; G04B 27/026; G04B 35/00
See application file for complete search history.

(56) References Cited

U.S. PATENT DOCUMENTS

| | | | |
|---|---|---|---|
| 4,081,950 A | 4/1978 | Chappatte | |
| 7,158,448 B1 * | 1/2007 | Gabathuler | G04B 19/25373 368/37 |
| 8,644,116 B2 * | 2/2014 | Gabathuler | G04B 19/02 368/37 |

(Continued)

FOREIGN PATENT DOCUMENTS

| | | |
|---|---|---|
| EP | 2407833 B1 | 3/2013 |
| EP | 2565729 A1 | 3/2013 |

(Continued)

OTHER PUBLICATIONS

EP Search Report and Written Opinion dated Jan. 31, 2024 in priority application No. EP23194760.7; with English translation (total 23 pages).

*Primary Examiner* — Edwin A. Leon
*Assistant Examiner* — Jason M Collins
(74) *Attorney, Agent, or Firm* — Seckel IP, PLLC

(57) ABSTRACT

Timepiece driving device (100), in particular for an instantaneous jump calendar system, the device including: an input mobile (13); a main cam (11) having a main cam profile, and connected to the input mobile either (i) with angular backlash or (ii) via a unidirectional coupling; an auxiliary cam (12) connected to the input mobile, and having an auxiliary cam profile; a cam follower (21) adapted to cooperate with the main cam profile and/or with the auxiliary cam profile; and an energy accumulator (22) elastically biasing the cam follower toward the main cam profile and toward the auxiliary cam profile, the timepiece driving device (100) being arranged so that the cam follower (21) comes substantially into contact with the auxiliary cam profile immediately at the end of the driving of the main cam (11) by action of the energy accumulator (22) on the main cam (11) via the cam follower (21).

20 Claims, 17 Drawing Sheets

(56) References Cited

U.S. PATENT DOCUMENTS

| | | | | |
|---|---|---|---|---|
| 8,675,453 | B2 * | 3/2014 | Gabathuler | G04B 19/25373 368/37 |
| 8,760,975 | B2 | 6/2014 | Rudaz | |
| 8,942,067 | B2 * | 1/2015 | Villar | G04B 19/25373 368/185 |
| 11,550,265 | B2 * | 1/2023 | Fleury | G04B 19/25373 |
| 11,703,805 | B2 * | 7/2023 | Saglini | G04B 19/25353 368/28 |
| 2012/0014224 | A1 | 1/2012 | Gabathuler et al. | |
| 2012/0057434 | A1 | 3/2012 | Rudaz | |
| 2013/0051183 | A1 | 2/2013 | Gabathuler et al. | |
| 2014/0160897 | A1 | 6/2014 | Gabathuler et al. | |

FOREIGN PATENT DOCUMENTS

| | | | |
|---|---|---|---|
| EP | 2428855 | B1 | 3/2019 |
| FR | 2304950 | A1 | 10/1976 |

* cited by examiner

TIMEPIECE DRIVING DEVICE

CROSS-REFERENCE TO RELATED APPLICATION

This application claims priority of European patent application No. EP23194760.7 filed Sep. 1, 2023, the content of which is hereby incorporated by reference herein in its entirety.

BACKGROUND ART

The invention concerns a timepiece driving device. The invention also concerns a timepiece calendar including such a timepiece driving device. The invention further concerns a timepiece movement including a timepiece driving device of this kind or a timepiece calendar of this kind. The invention also concerns a timepiece including a timepiece movement of this kind or a timepiece driving device of this kind or a timepiece calendar of this kind. The invention also concerns a method of operating a timepiece movement of this kind or a timepiece of this kind or a timepiece driving device of this kind or a timepiece calendar of this kind.

There are known from the prior art instantaneous timepiece calendar systems that employ a driving mobile provided with a cam that cooperates with an energy accumulation device such as a cam lever associated with a spring.

Driven by a driving wheel, the cam enables cocking of the energy accumulation device in a cocking phase and returning the energy during a successive phase of instantaneous driving of the calendar. The cam is then in driving mode and turns relative to the driving wheel. The energy returned serves to drive the cam and a mechanism downstream of the cam.

In a compensation phase following the instantaneous driving phase the cam is immobilized until it has been caught up with and is driven again by the driving wheel so as to cock the energy accumulation device.

The compensation phase can last about 4 to 11 hours depending on the design of the calendar. During this compensation phase the driving wheel turns with no load and consumes very little power compared to the cocking phase. This results in variations of the amplitude of the oscillator of the timepiece movement because of the difference in the load on the driving wheel between the compensation and cocking phases.

The patent EP2407833B1 discloses a solution employing an instantaneously driven date mobile including an auxiliary energy accumulation means intended to compensate the backlash in the gears of a time display train.

The instantaneous driving mobile functions in a conventional manner and successively in:

- a cocking phase in which a calendar cam is driven by a driving wheel so as to cock a spring by means of a cam lever,
- an instantaneous driving phase in which the spring is decocked, the cam then being in driving mode and advancing relative to the driving wheel, and
- a compensation phase in which the driving wheel compensates the advance of the calendar cam immobilized after the jump.

The specifics of the solution disclosed reside in the fact that the auxiliary energy accumulation means is between the calendar cam and the driving wheel. The auxiliary energy accumulation means is cocked during the compensation phase and is intended to generate a resisting torque on the driving wheel. The time display train is therefore also under tension during the compensation phase, limiting the backlash in the gears of said train.

However, it is necessary for the cocking torque of the auxiliary energy accumulation means to be lower than the torque necessary to arm the spring of the cam lever. Consequently the auxiliary energy accumulation means cannot enable significant accumulation of energy that is equivalent to that achieved by cocking the spring of the cam lever.

SUMMARY OF THE INVENTION

The object of the invention is to provide a timepiece driving device enabling improvement of the devices known from the prior art. In particular the invention proposes a timepiece driving device enabling the best possible temporal distribution of energy consumption, in particular over a period of rotation of a driving wheel.

A driving device in accordance with the invention is defined by point 1 below.

1. A timepiece driving device, in particular for a system for displaying time information or information derived from the time, in particular for an instantaneous jump calendar system, including:
   - an input mobile;
   - a main cam having a main cam profile, the main cam being connected to the input mobile (i) with angular backlash or (ii) via a unidirectional coupling;
   - an auxiliary cam connected to the input mobile, in particular fixed onto the input mobile or secured to the input mobile, and having an auxiliary cam profile,
   - a cam follower adapted to cooperate with the main cam profile and/or with the auxiliary cam profile, and
   - an energy accumulator elastically biasing the cam follower toward the profile of the main cam and toward the profile of the auxiliary cam,
   - the timepiece driving device, in particular the main cam and auxiliary cam, being arranged so that the cam follower comes into contact or substantially into contact with the auxiliary cam profile immediately at the end of the driving of the main cam by action of the energy accumulator on said main cam via the cam follower.

Embodiments of the driving device are defined by claims 2 to 9.

2. The timepiece driving device as defined in the preceding point, characterized in that the timepiece driving device, in particular the main cam and the auxiliary cam, is adapted so as to cock the energy accumulator via the cam follower over substantially the whole of the period of rotation of the input mobile, in particular over a period of 24 hours, with the exception of the driving phase in which the main cam is in driving mode.
3. The timepiece driving device as defined in point 1 or 2, characterized in that the main cam and the auxiliary cam pivot about the same axis.
4. The timepiece driving device as defined in point 1 or 2, characterized in that the main cam and the auxiliary cam pivot about different axes, in particular about parallel axes.
5. The timepiece driving device as defined in any one of the preceding points, characterized in that the driving device is such that:
   - the main cam is in driving mode by virtue of the action of the energy accumulator via the cam follower over a first angular portion, and the auxiliary cam supplies energy to the energy accumulator via the cam follower over a second angular portion at least equal to or at least substantially equal to the first angular portion, and the main cam supplies energy to the energy accumulator via the cam follower over a third angular portion that is (i) complementary to the second angular portion and/or (ii) zero or substantially zero.

6. The timepiece driving device as defined in any one of the preceding points, characterized in that the driving device, in particular the profiles of the main cam and the auxiliary claim, are such that the mechanical power supplied to the energy accumulator is constant or substantially constant throughout the time for which the main cam is not driven by the energy accumulator via the cam follower.

7. The timepiece driving device as defined in any one of the preceding points, characterized in that the cam follower comprises a lever.

8. The timepiece driving device as defined in any one of the preceding points, characterized in that the energy accumulator comprises a spring, in particular a leaf spring.

9. The timepiece driving device as defined in any one of the preceding points, characterized in that the main cam is kinematically connected to a driving element of an element for displaying time information, in particular fixed to a driving element of an element for displaying time information, such as a finger, cooperating with teeth of an element for displaying time information.

A timepiece calendar in accordance with the invention is defined by claim 10.

10. A timepiece calendar, in particular a single date calendar or an annual date calendar or a perpetual date calendar, including a timepiece driving device as defined in any one of the preceding points, the calendar including an element for displaying time information such as a disc carrying numbers, including teeth.

A timepiece movement in accordance with the invention is defined by claim 11.

11. A timepiece movement including:

a timepiece driving device as claimed in any one of claims 1 to 9, and/or a timepiece calendar as defined in the preceding point.

A timepiece in accordance with the invention is defined by claim 12.

12. A timepiece, in particular a wristwatch, including:

a timepiece movement as claimed in the preceding claim, and/or a timepiece calendar as claimed in claim 10, and/or a timepiece driving device as defined in any one of points 1 to 9.

An operating method in accordance with the invention is defined by claim 13.

13. A method of operating a timepiece as defined in the preceding point or a timepiece movement as defined in point 11 or a timepiece calendar as defined in point 10 or a timepiece driving device as defined in any one of points 1 to 9, the method including at least one iteration of the following steps:

driving of the main cam by action of the energy accumulator on the main cam via the cam follower, then accumulation of energy in the energy accumulator by action of the auxiliary cam on the energy accumulator via the cam follower.

Ways of executing the operating method are defined by points 14 and 15 below.

14. The operating method as defined in the preceding point, characterized in that the method includes accumulation of energy in the energy accumulator by action of the main cam on the energy accumulator via the cam follower.

15. The operating method as defined in point 13 or 14, characterized in that the driving of the main cam is instantaneous driving.

BRIEF DESCRIPTION OF THE DRAWINGS

The appended drawings represent by way of example two embodiments of a timepiece in accordance with the invention.

DETAILED DESCRIPTION OF PARTICULAR EMBODIMENTS

Figure 1:
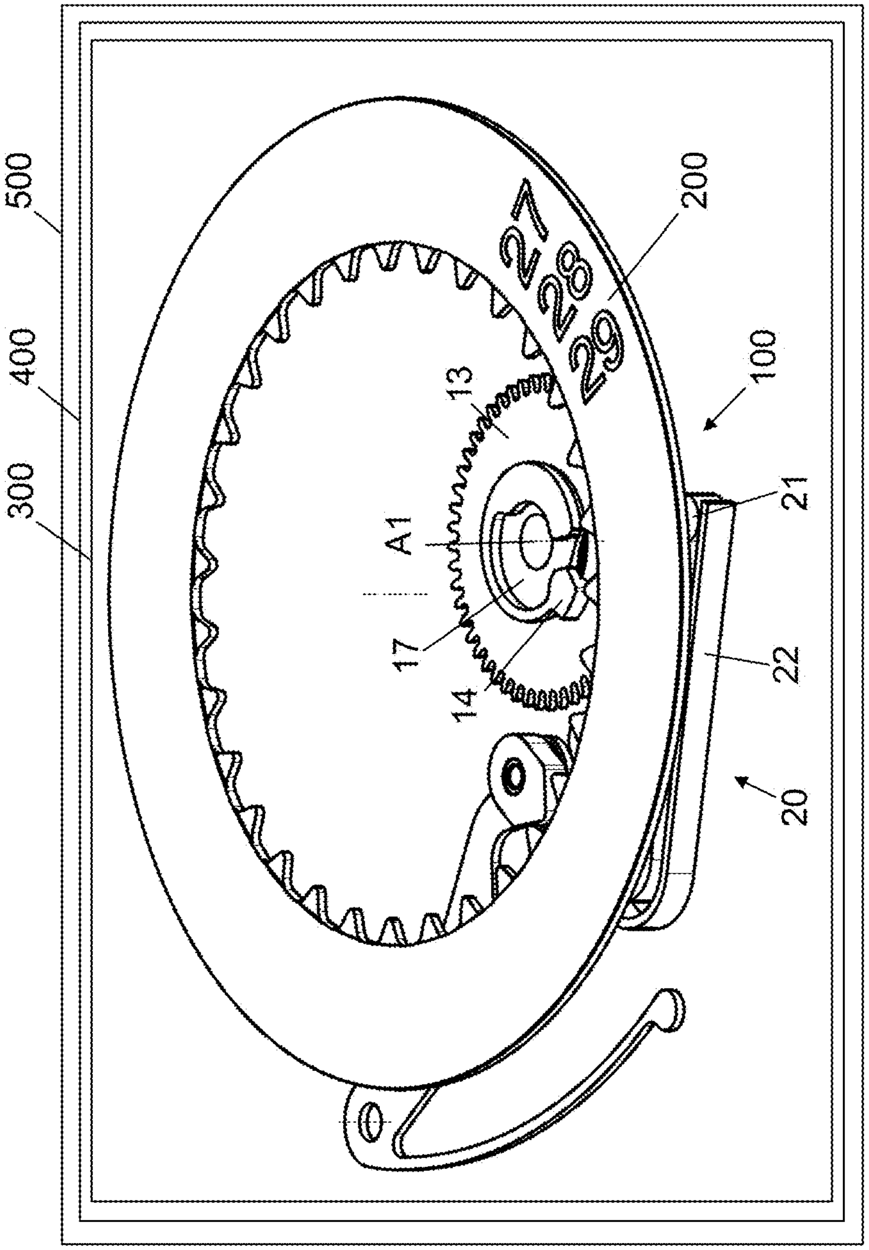
FIG. 1 is a view of one first embodiment of a timepiece in accordance with the invention, a driving device being seen from the dial side.
Figure 2:
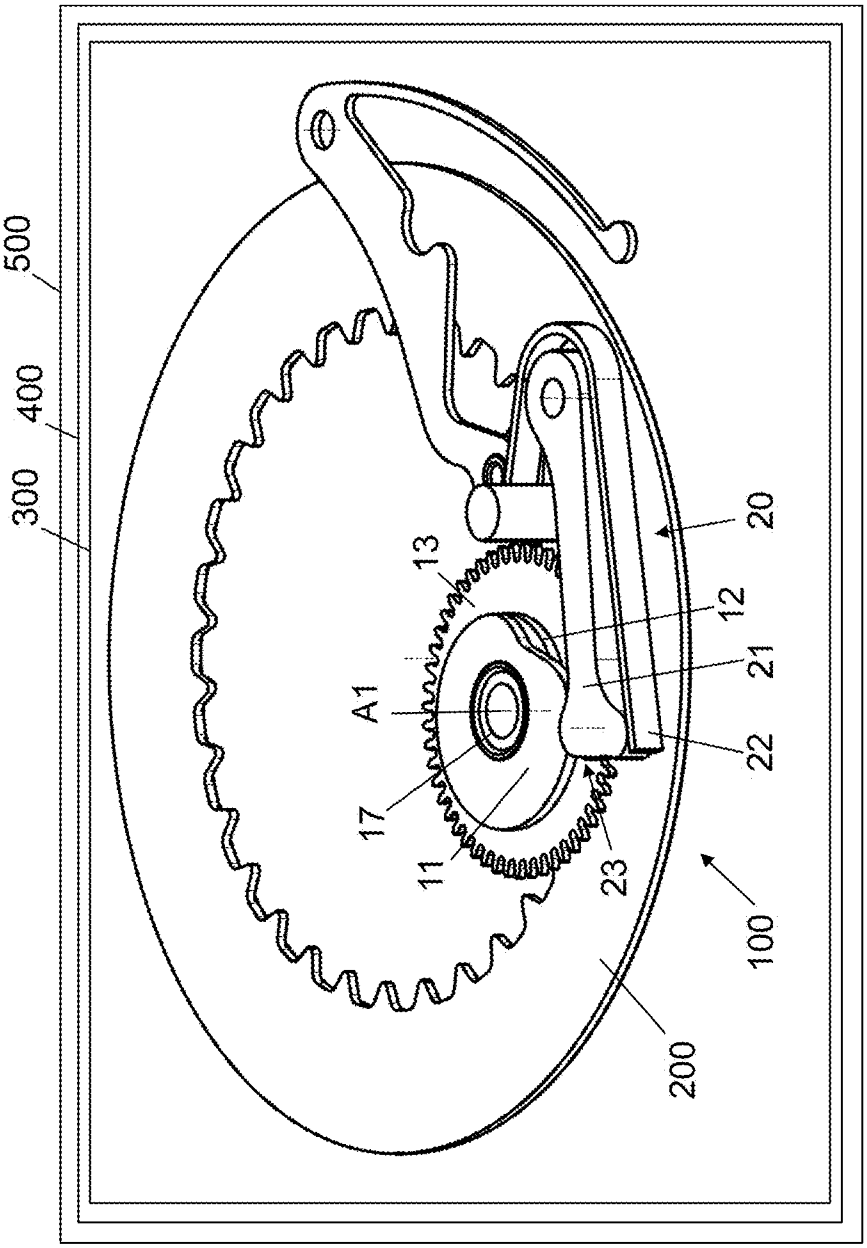
FIG. 2 is a view of that first embodiment of the timepiece in accordance with the invention, the driving device being seen from the movement side.
Figure 3:
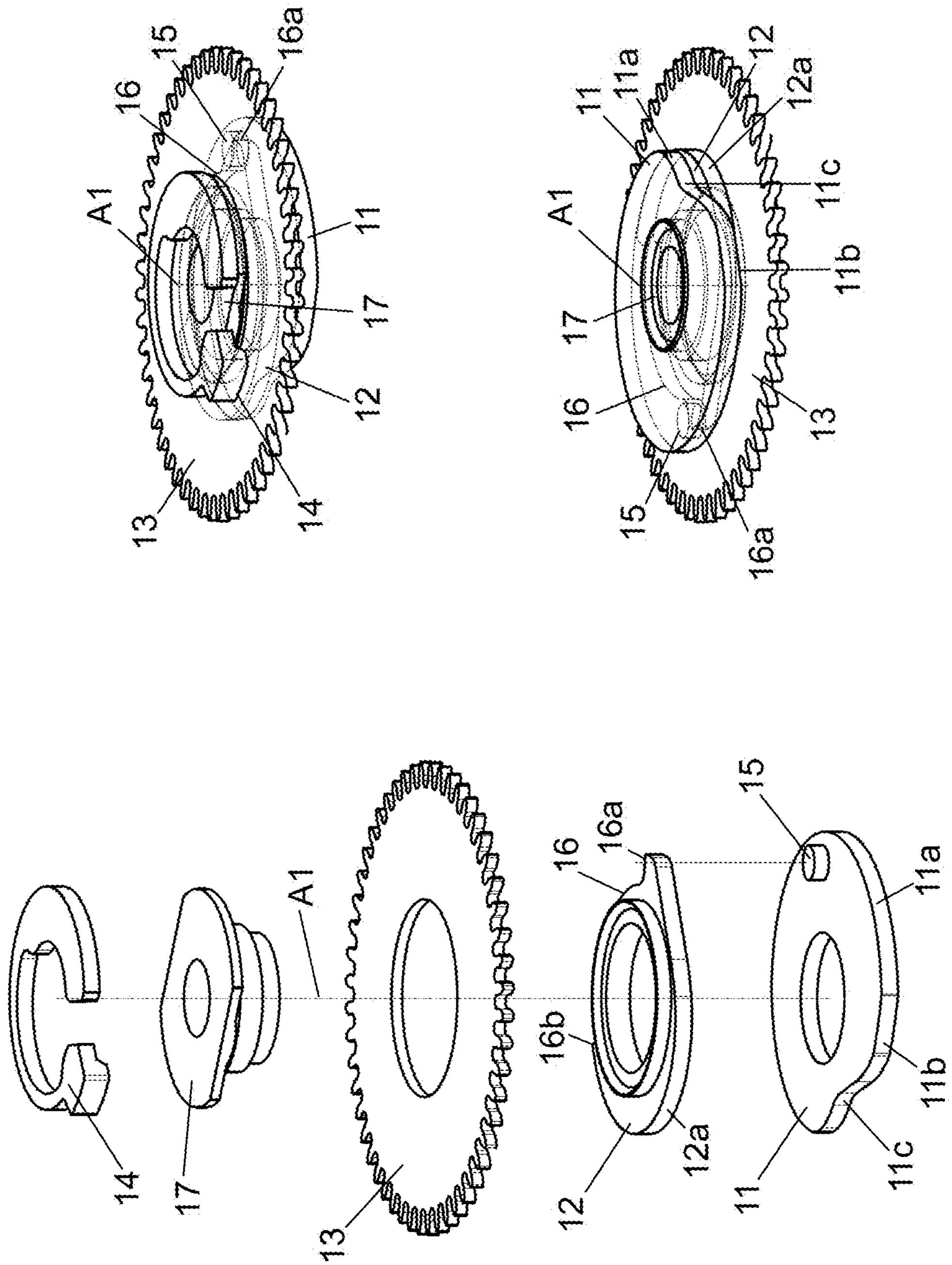
FIG. 3 is a set of views of the driving device comprising an exploded view and two perspective views.

One first embodiment of a timepiece 500 is described in detail hereinafter with reference to FIGS. 1 to 10.

The timepiece 500 is for example a watch, in particular a wristwatch. The timepiece 500 includes a timepiece movement 400 intended to be mounted in a timepiece case in order to protect it from the external environment.

The timepiece movement 400 is a mechanical movement, in particular an automatic movement, or a hybrid movement or an electronic movement.

The timepiece movement 400 includes a timepiece calendar 300.

The timepiece calendar 300 includes:

at least one display member 200, in particular a date display member, in particular a date display disc, and a timepiece driving device 100, the at least one display member 200 and the driving device 100 being such that the driving device 100 is able to drive the at least one display member 200. The driving is of the instantaneous driving or instantaneous jump type.

The calendar system 300 enables display via the at least one display member 200 of at least one calendar indication such as a day indication, a date indication, a month indication, a year indication, a bissextile year indication, a phase of the Moon indication.

The at least one calendar indication may be carried by the at least one display member 200 such as a hand or a disc.

The timepiece driving device 100 includes:

an input mobile 13;

a main cam 11 having a main cam profile 11*a*, 11*b*, 11*c*, the main cam 11 being connected to the input mobile (i) with angular backlash or (ii) via a unidirectional coupling;

- an auxiliary cam 12 connected to the input mobile, in particular fixed onto the input mobile or secured to the input mobile, and having an auxiliary cam profile 12*a,*
- a cam follower 21 adapted to cooperate with the profile 11*a*, 11*b*, 11*c* and/or with the profile 12*a*, and
- an energy accumulator 22 elastically biasing the cam follower 21 toward the profile 11*a*, 11*b*, 11*c* of the main cam 11 and toward the profile 12*a* of the auxiliary cam 12.

The timepiece driving device 100, in particular the main cam and the auxiliary cam, are arranged so that the cam follower 21 comes into contact or substantially into contact with the auxiliary cam profile immediately at the end of the driving of the main cam 11 by the action of the energy accumulator 22 on said main cam 11 via the cam follower 21. Thus it is possible to cock the energy accumulator immediately at the end of the driving of the main cam 11, which is effected by action of the energy accumulator 22 on said main cam 11 via the cam follower 21.

The timepiece driving device 100, in particular the main cam and the auxiliary cam, is advantageously arranged so as to cock the energy accumulator 22 via the cam follower 21 over all or substantially all of the rotation period of the input mobile 13, in particular a period of 24 hours, with the exception of a driving phase in which the main cam is in driving mode. This makes it possible to minimize and to smooth the mechanical power necessary for cocking the energy accumulator. To this end the driving device, in particular the profiles of the main cam and of the auxiliary cam, are such that the mechanical power supplied to the energy accumulator 22 is constant or substantially constant throughout the time for which the main cam 11 is not in driving mode or more particularly throughout the time during which the main cam 11 is not driven by the energy accumulator 22 via the cam follower 21.

The input mobile 13 and the auxiliary cam 12 are part of a first mobile.

The main cam 11 is part of a second mobile.

The first and second mobiles are pivoted in a frame of the timepiece movement 400.

The second mobile includes a driving element 14 kinematically connected to the main cam 11 or secured to the main cam 11. The driving element 14 may be fixed onto the main cam 11. The driving element 14 is intended to drive the display member 200 directly and periodically.

The main cam 11 is intended to cooperate with an energy accumulation device 20 so as periodically to accumulate and periodically to return instantaneously the energy necessary for driving the display member 200.

The accumulation device 20 includes:

- a cam follower, such as a cam lever 21 pivoted in the frame, and
- an energy accumulator 22 such as a return spring means 22 that makes it possible to accumulate the energy necessary for the instantaneous driving of the display member 200. Furthermore, the elastic energy accumulator 22 tends to bias the lever 21 against the main cam 11. The energy accumulator 22 may include a spring 22, in particular a leaf spring.

The input mobile 13 includes a driving wheel 13 secured to the auxiliary cam 12. The input mobile is driven continuously by a train of the timepiece movement 400. It is intended to drive the second mobile or more specifically the main cam 11 via a decoupling device.

The decoupling device in particular enables:

- driving of the second mobile by the first mobile or securing together of the first and second mobiles during a phase of cocking the energy accumulation device 20, and
- decoupling or separating the first and second mobiles during an instantaneous driving phase.

The instantaneous driving phase is the phase in which the energy accumulated by the energy accumulation device 20 is returned and the display member 200 is driven instantaneously by the driving element 14.

The decoupling device includes a portion 15 on one of the first or second mobiles intended to cooperate with an angular abutment 16*a* on the other of the first or second mobiles so that the rotation of the input mobile 13 can drive rotation of the cam 11, in particular during the cocking phase.

During the instantaneous driving phase the decoupling device allows a degree of freedom in rotation of the second mobile relative to the first mobile or more specifically a degree of freedom in rotation of the main cam 11 relative to the input mobile 13.

This degree of freedom may in particular be achieved by shaping the portion 15, which is adapted to move in a groove 16 in a direction that is orthoradial relative to the rotation axis of the first and/or second mobile. In the first embodiment depicted in the figures the groove 16 includes the angular abutment 16*a*. In particular the groove 16 extends between two angular abutments 16*a*, 16*b*. Alternatively, this degree of freedom could be achieved by a freewheel.

The input mobile 13 preferably turns at a constant speed. Consequently, the decoupling device must enable the main cam 11 to travel instantaneously and substantially completely the angular travel necessary for the driving phase. Consequently, during the driving phase the portion 15 is decoupled and moved relative to the angular abutment 16*a* in the groove 16.

At the end of the instantaneous driving phase the driving element 14 and the main cam 11 are stationary for the time taken for the input mobile 13 to catch up with the latter in a compensation phase. More particularly, the angle of travel that the main cam 11 has performed during the instantaneous driving phase must be compensated so that the portion 15 is again in contact with the angular abutment 16*a* and again drives the main cam 11. The compensation phase therefore succeeds the driving phase and precedes the cocking phase.

One particular feature of the solution resides in the fact that immediately after the phase of instantaneous driving of the display 200 the lever 21 is in contact with the auxiliary cam 12 and is out of reach of the main cam 11 so as to commence a first cocking of the energy accumulation device 20 immediately at the end of the instantaneous driving phase. This first cocking continues for at least the whole of the compensation phase and until the cam lever 21 is again in contact with the main cam 11.

The lever 21 is preferably in contact with the auxiliary cam 12 exclusively during the compensation phase.

From one phase to the other the transitions of contact of the lever 21 of the main cam 11 with the auxiliary cam 12 and vice versa are sized so as to be as continuous as possible with no sudden interruption and no significant disturbance in respect of the power consumption of the timepiece movement 400 and thus to prevent variations of amplitude.

In the embodiments depicted the instantaneous driving device 100 is designed to allow instantaneous driving of a calendar date system 300 including a date disc 200 indexed by a jumper.

The first and second mobiles are coaxial and pivot about an axis A1. Thus the main cam 11 and the auxiliary cam 12 pivot about the same axis A1.

The driving element 14 is a date finger 14 intended to cooperate with teeth 201 of the date disc 200 during the instantaneous driving phase. Here the date finger 14 is welded to a hub 17 driven into and/or riveted onto the main cam 11.

The hub 17 pivots on the frame about the axis A1.

The profile of the main cam 11 adapted to cooperate with the energy accumulation device 20 comprises successively a cocking portion 11*a*, a return portion 11*b* and a stop portion 11*c*. The functionalities of these portions are described in more detail hereinafter.

The period of rotation of the driving wheel 13 is 24 hours so as to enable driving of the calendar system 300 by at least one step each day. In other words, for each period of rotation of the driving wheel 13 the instantaneous driving device 100 is respectively and successively in:

the compensation phase, then the cocking phase, then the instantaneous driving phase.

The auxiliary cam 12 is secured to the driving wheel 13 by driving it in and/or riveting it on. Alternatively, the driving wheel 13 and the auxiliary cam 12 could be in one piece, i.e. then forming a monobloc assembly.

The driving wheel 13 and the auxiliary cam 12 are assembled so as to pivot on the hub 17 about the axis A1. Alternatively, they could pivot directly on the frame.

The auxiliary cam 12 includes a portion for pre-cocking the profile 12*a* adapted to cooperate with the energy accumulation device 20 during the compensation phase.

The decoupling device consists of a stud 15 assembled onto or in one piece with the main cam 11 adapted to cooperate with an angular abutment 16*a* at the first end of a groove 16 machined into a portion of the perimeter of the auxiliary cam 12.

Alternatively, the groove 16 could be machined into the driving wheel 13.

The length of the groove 16 enables the stud 15 to travel substantially all of the angular travel necessary for the driving phase. In other words, the angle of rotation that the stud 15 is able to travel in the groove 16 must at least correspond to the angle of rotation of the date finger 14 and the main cam 11 during the driving phase.

Alternatively or additionally the angular travel necessary for the driving phase, more specifically the angular travel of the stud 15, may be limited by the second angular abutment 16*b* at a second end of the groove 16.

The cam lever 21 advantageously includes a bearing or more specifically a jewel or a ruby roller 23. The latter is adapted to cooperate with the respective profiles of the main cam 11 and the auxiliary cam 12.

The roller 23 makes it possible to reduce the friction torque induced by the force with which the lever 21 bears against the main cam 11 and/or the auxiliary cam 12. Consequently, this roller 23 enables reduction of the energy consumption and the amplitude losses of the oscillator of the timepiece movement 400.

One method of executing a method of operating the timepiece or the timepiece movement or the timepiece calendar or the driving device is described hereinafter.

Cocking Phase

Figure 4:
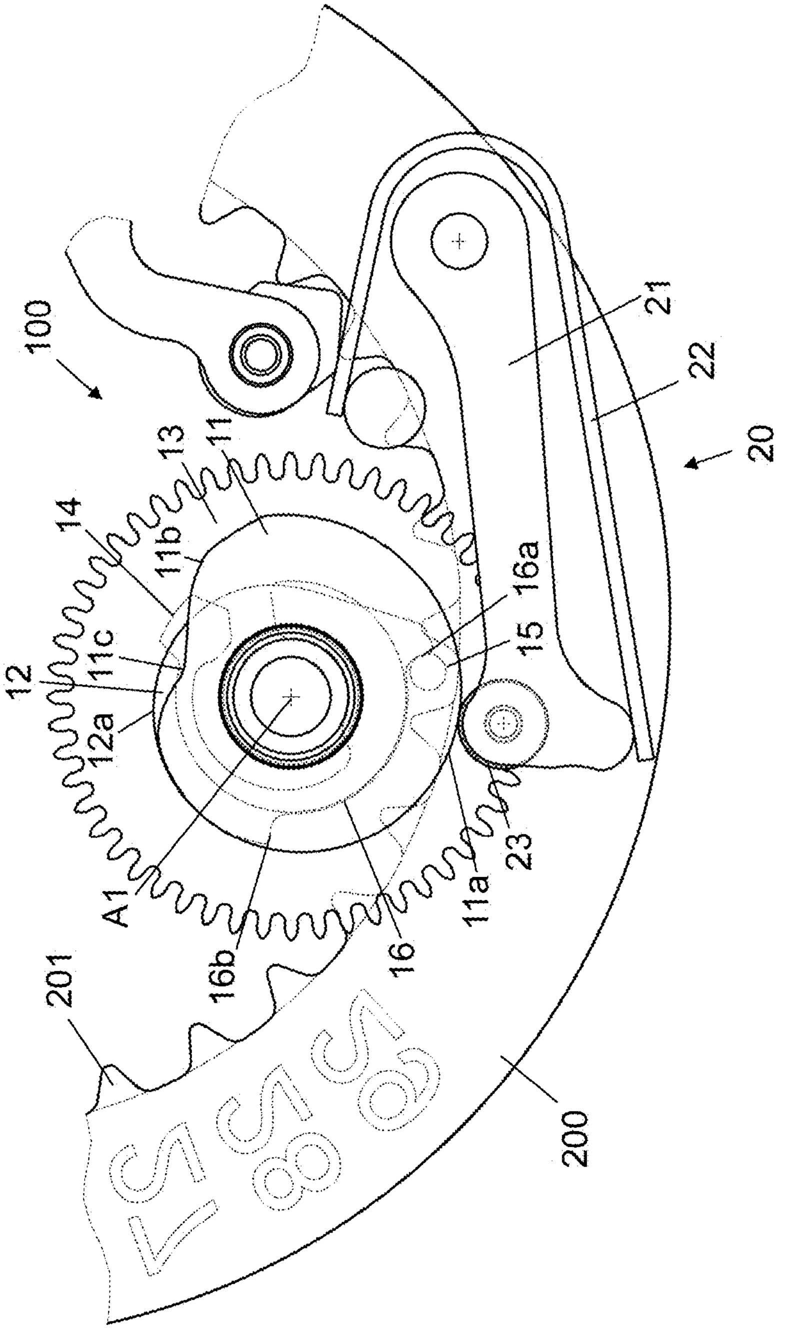
FIGS. 4 to 10 are views of operating sequences of the first embodiment of the driving device.

During the cocking phase, depicted in FIG. 4, the roller 23 is located on a cocking portion 11*a*. This portion enables cocking of the energy accumulation device 20 in such a manner as to accumulate the energy necessary for the instantaneous driving of the display member 200 by at least one step. During the cocking phase the main cam 11 is driven by the input mobile 13 by means of the stud 15 abutted against the angular abutment 16*a* of the groove 16.

The energy accumulation device 20, and more specifically the roller 23, is preferably out of reach of the auxiliary cam 12 during this phase.

The cocking portion 11*a* is preferably shaped so as to generate a constant or substantially constant consumption of power and amplitude loss of the balance. In other words, this portion makes it possible to obtain a constant or substantially constant cocking torque on the input mobile 13.

In other words, during the cocking phase, the follower 21 follows the main cam profile 11*a*, while energy is accumulated in the spring 22 and the profile of the auxiliary cam 12 is not in contact with the follower 21. It is therefore the input wheel that drives the main cam, the follower 21 follows the profile 11*a* of this cam and the spring 22 is gradually cocked. The energy is therefore transferred according to the following chain: barrel, geartrain, input wheel 13, main cam 11, follower 21, spring 22.

Driving Phase

Figure 5:
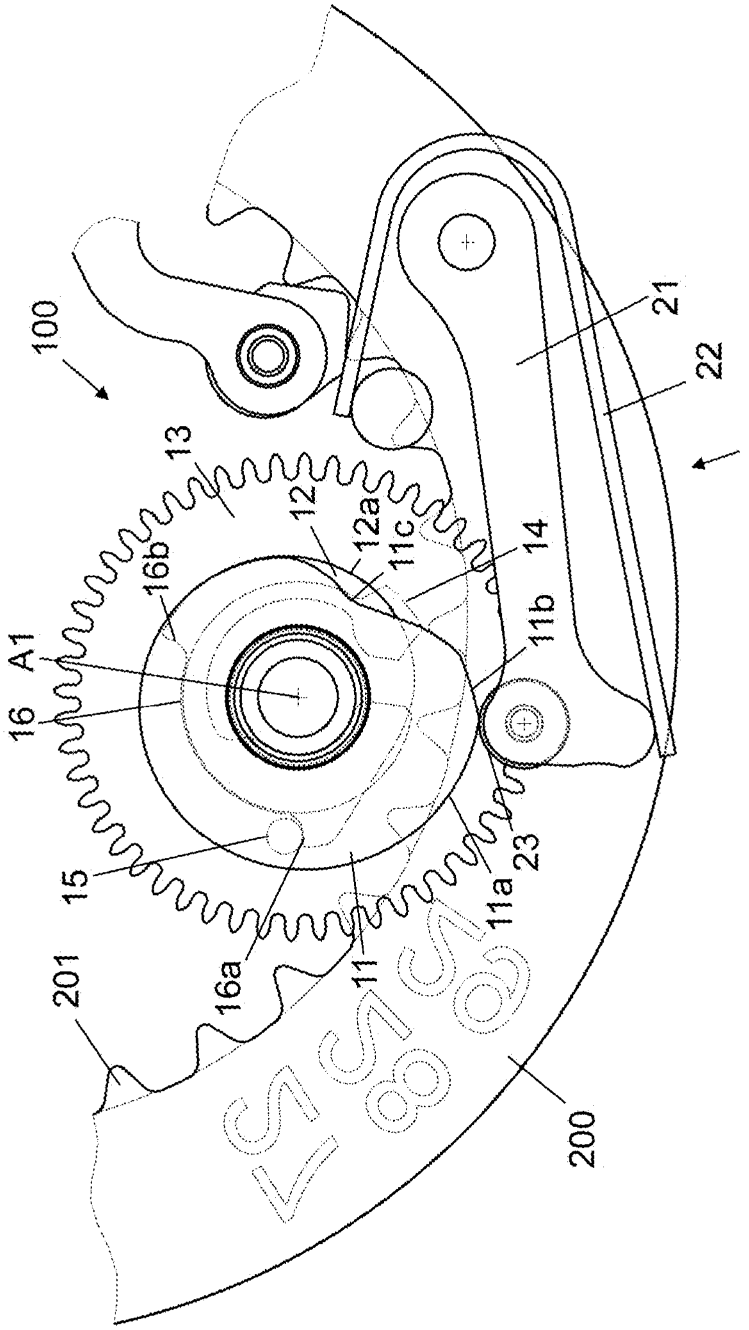

When the roller 23 reaches the apex of the main cam 11, as depicted in FIG. 5, at the end of the cocking portion 11*a* of the profile of the main cam 11, at the exact moment of the transition to a return portion 11*b* of the profile of the main cam 11, the roller 23 instantaneously travels the latter until it reaches a stop portion 11*c* of the profile of the main cam 11.

Figure 6:
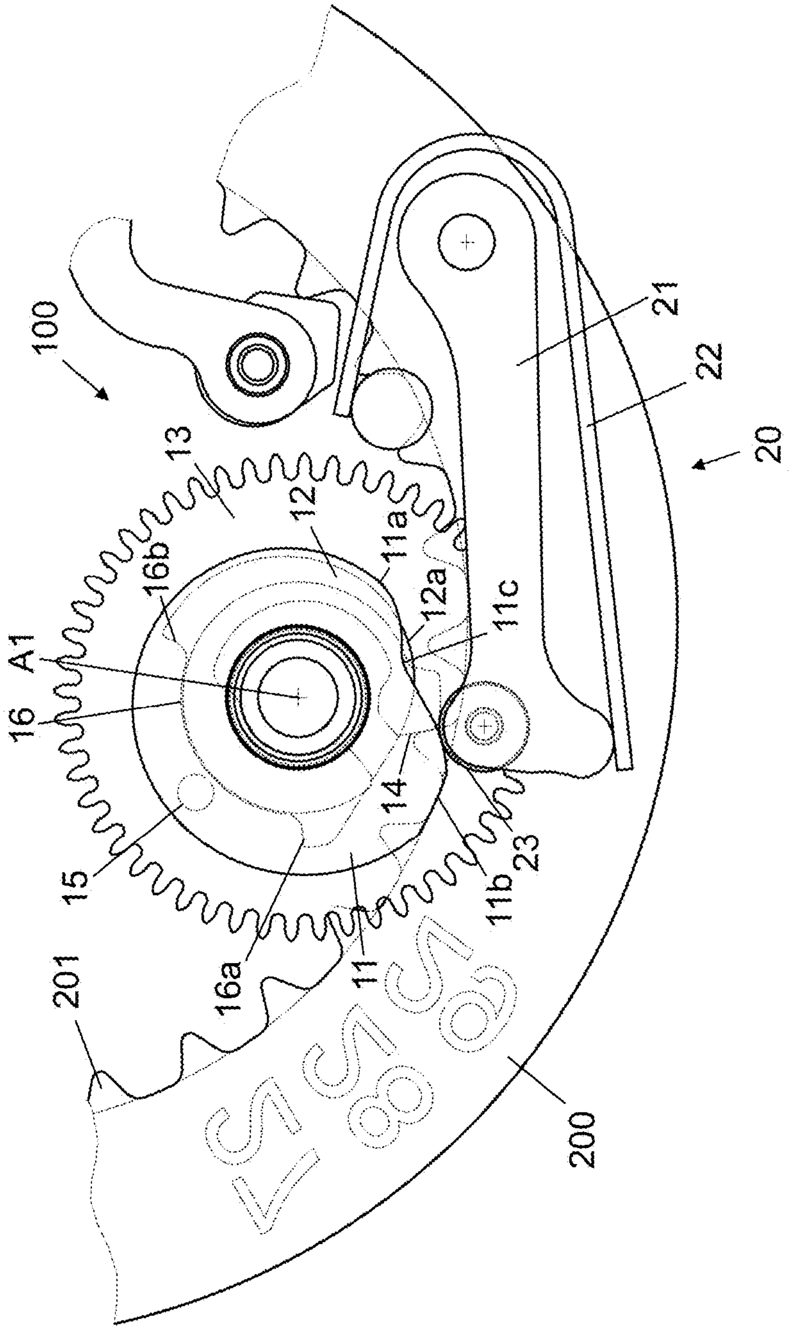

During this driving phase, depicted in FIG. 6, the energy stored by the energy accumulation device 20 is returned for the instantaneous driving of the display member 200 by the date finger 14. In other words, at midnight the main cam 11 and the date finger 14 are in driving mode thanks to the return of the energy previously accumulated and relative to the input mobile 13. The stud 15 is then decoupled from the angular abutment 16*a* and travels instantaneously the angular travel necessary for the driving phase in the groove 16.

The auxiliary cam 12 is out of reach of the energy accumulation device 20 and more specifically of the roller 23 at all times during the driving phase.

At the end of the driving phase it is advantageous for the date finger 14 to be stopped and to remain positioned in a position of interference with the teeth 201 of the date disc 200 in order to constitute an obstacle to it and to prevent an untimely additional jump because of its inertia and the considerable energy that is returned during this phase.

Figure 7:
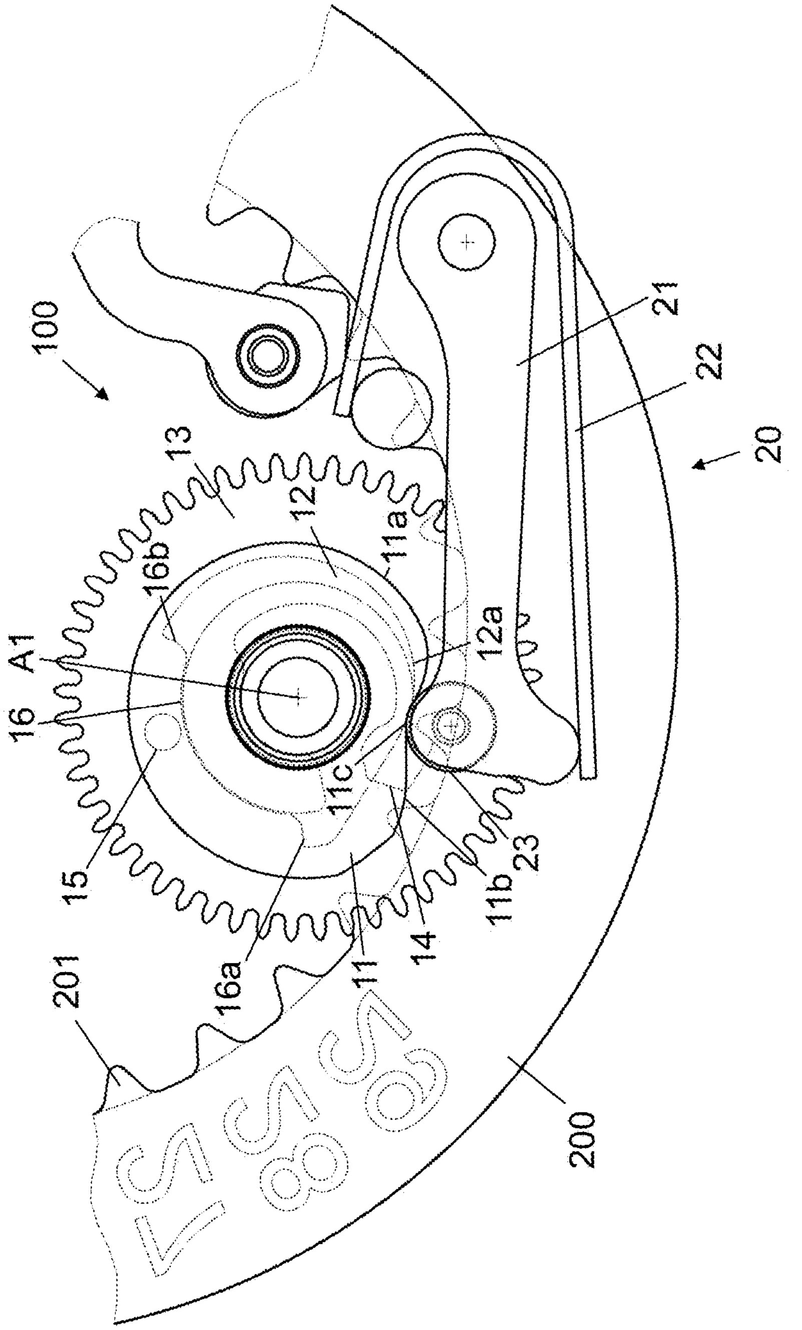

To this end, as depicted in FIG. 7 the roller 23 is located on the stop portion 11*c* which is sized so as to dissipate the residual kinetic energy after driving the display member 200.

In a complementary or alternative manner, the second abutment 16*b* may be used for the partial or total dissipation of said residual kinetic energy.

The display member 200 is also stopped instantaneously. In other words, the instantaneous driving phase includes stopping the display member 200.

In other words, during the driving phase, the main cam 11 is driven, the follower 21 travels abruptly along the profile 11*b* of the main cam 11 and causes its release from the wheel 13 as well as the jump drive of the display member 200. In this phase, it also turns out that the profile of the auxiliary cam 12 is not in contact with the follower 21. The energy is therefore transferred according to the following chain: spring 22, follower 21, main cam 11, display member 200.

Compensation Phase

As described above the main cam 11 is decoupled from the input mobile 13 at the start of the instantaneous driving phase. The angular abutment 16*a* must then catch up with the stud 15 to drive the main cam 11 again.

Figure 8:
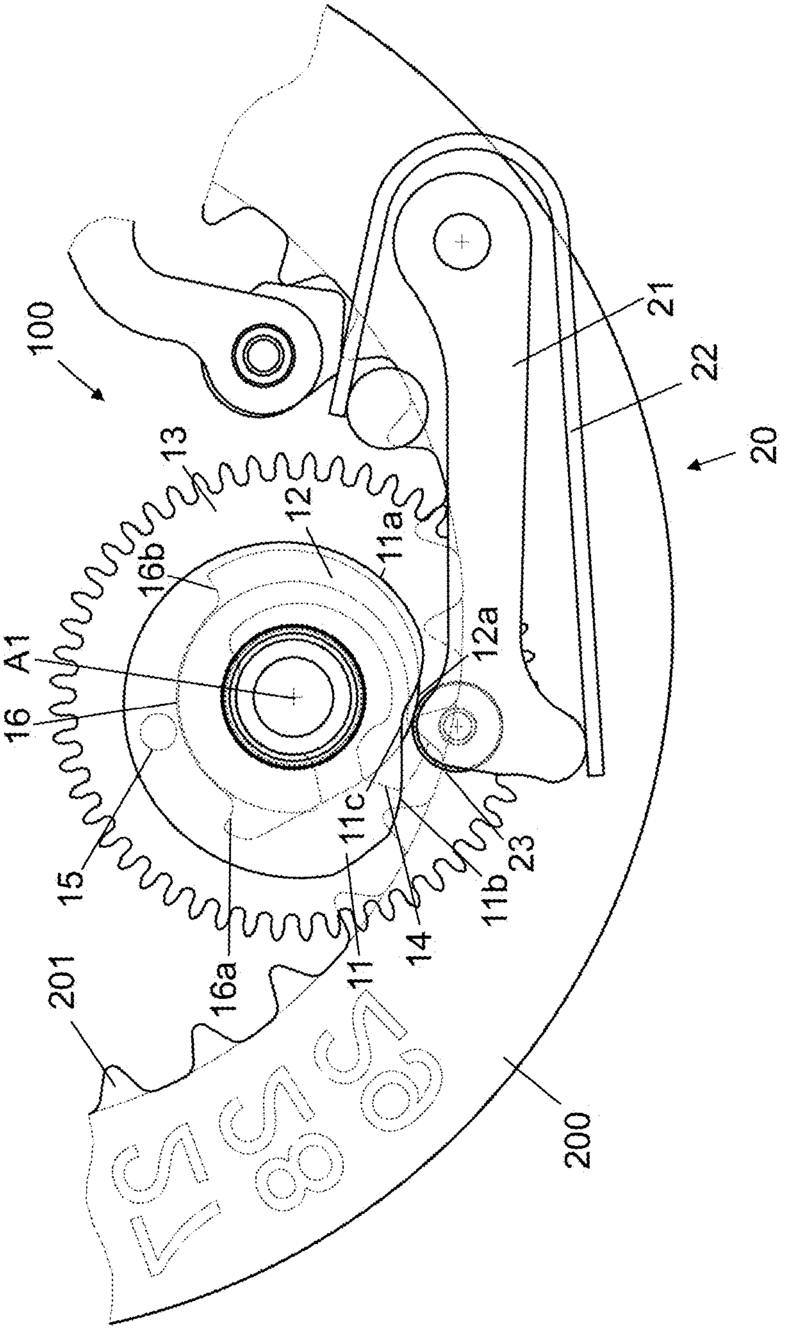

During this compensation phase, as depicted in FIG. 8, a pre-cocking portion of the profile 12*a* of the auxiliary cam 12 advantageously comes into contact with the energy accumulation device 20 and more specifically with the roller 23. This pre-cocking portion is shaped in such a manner as to commence the cocking of the energy accumulation device 20 after the instantaneous driving phase and until the energy accumulation device 20 cooperates again with the cocking portion 11*a* of the profile of the main cam 11 and initiates the cocking phase.

As for the cocking portion 11*a*, the pre-cocking portion of the profile 12*a* is preferably shaped so as to generate a constant cocking torque at the level of the input mobile 13 and consequently constant consumption of power by and constant amplitude loss of the balance.

Figure 9:
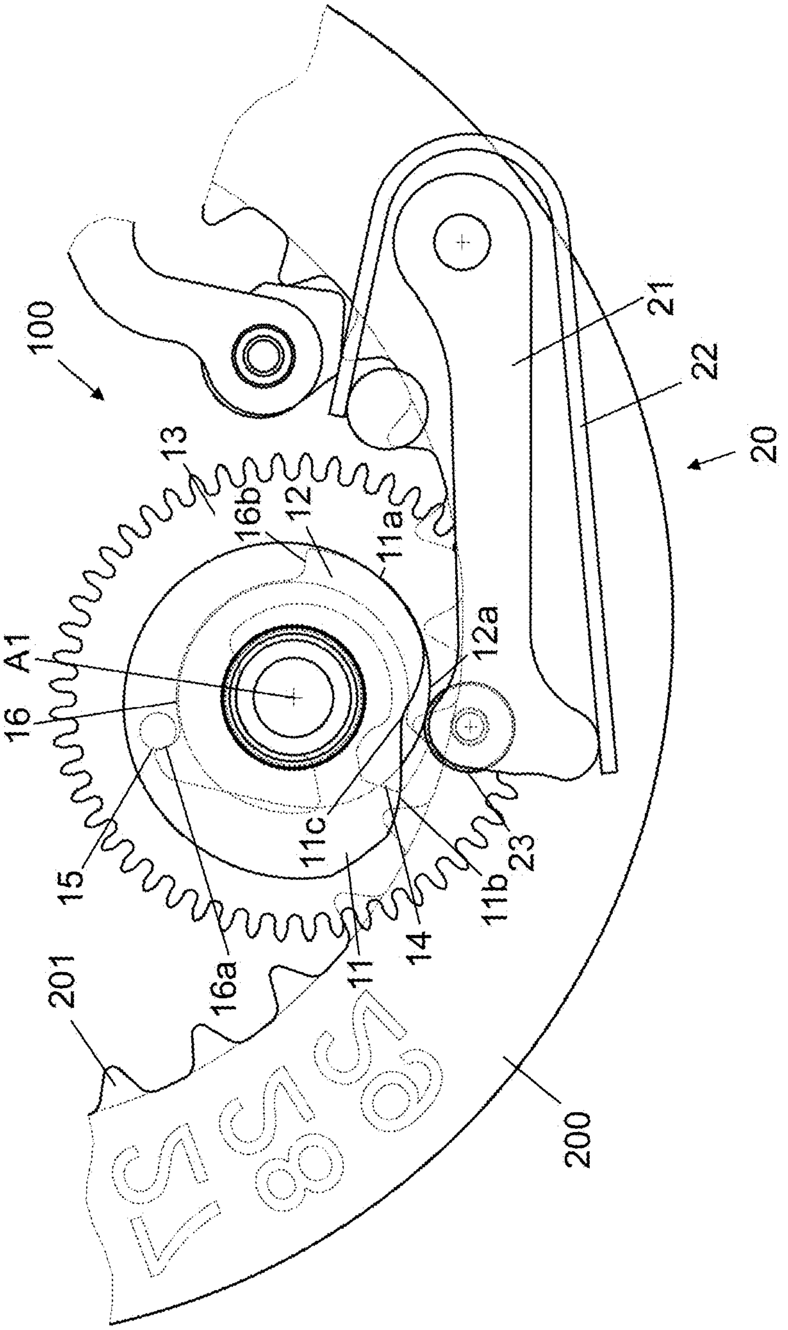
Figure 10:
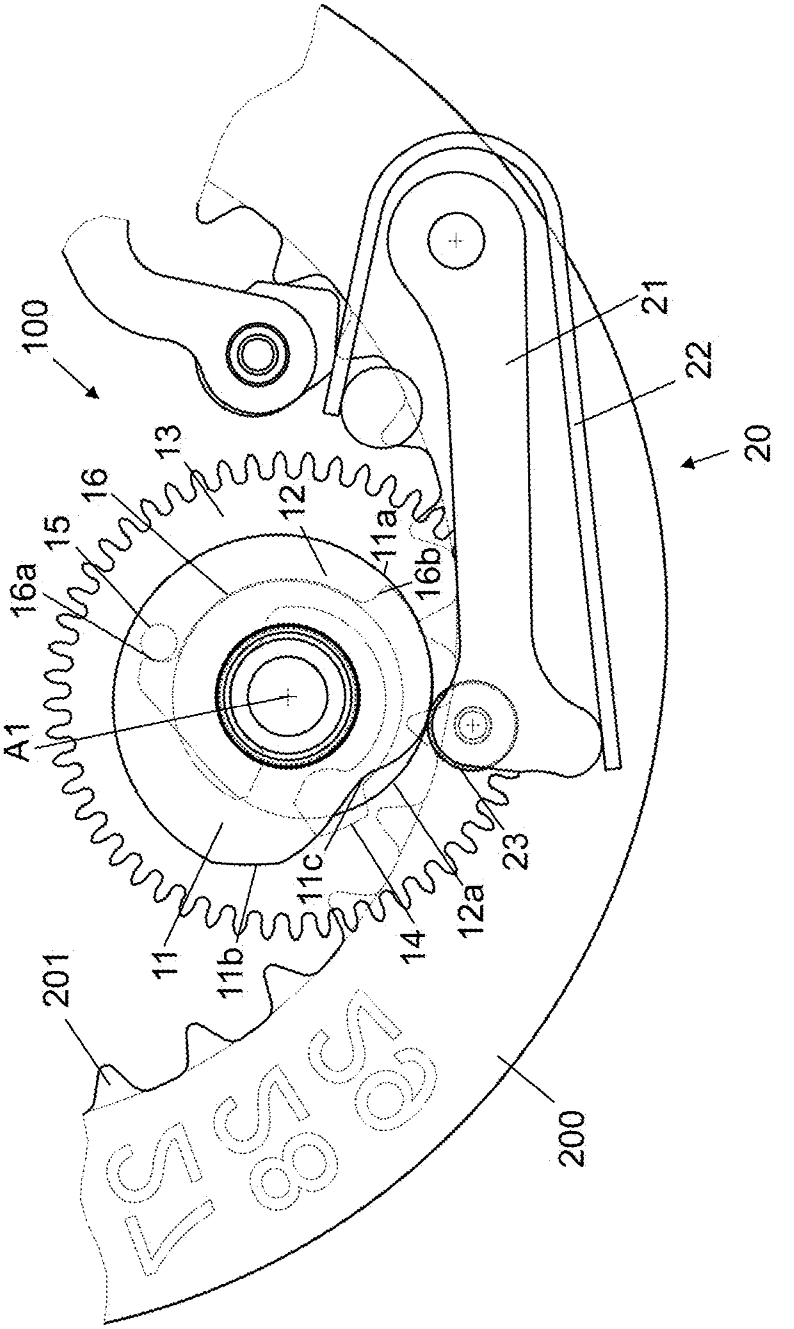
Figure 11:
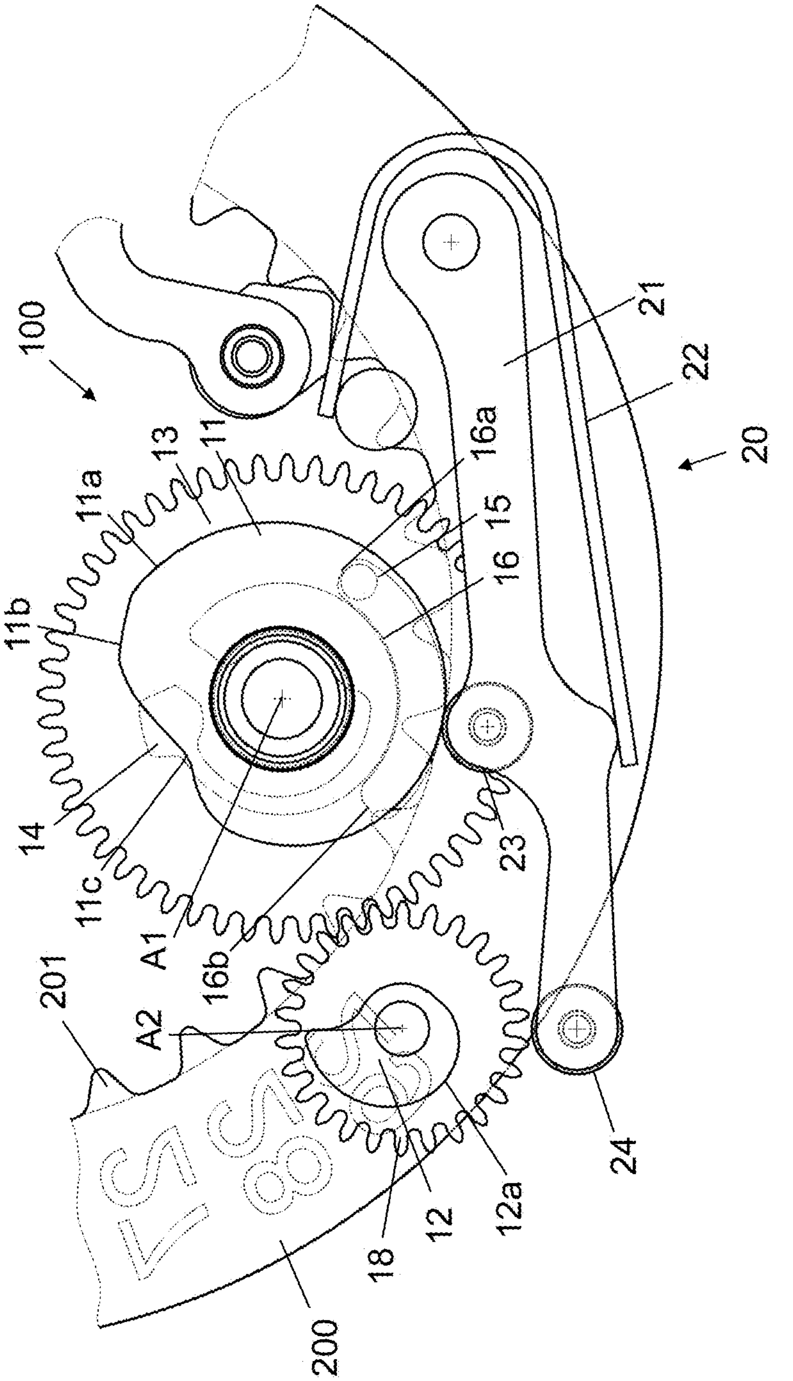
FIGS. 11 to 17 are views of operating sequences of a second embodiment of the driving device, FIGS. 11 to 17 illustrating the second embodiment being equivalent to FIGS. 4 to 10 illustrating the first embodiment, respectively.
Figure 12:
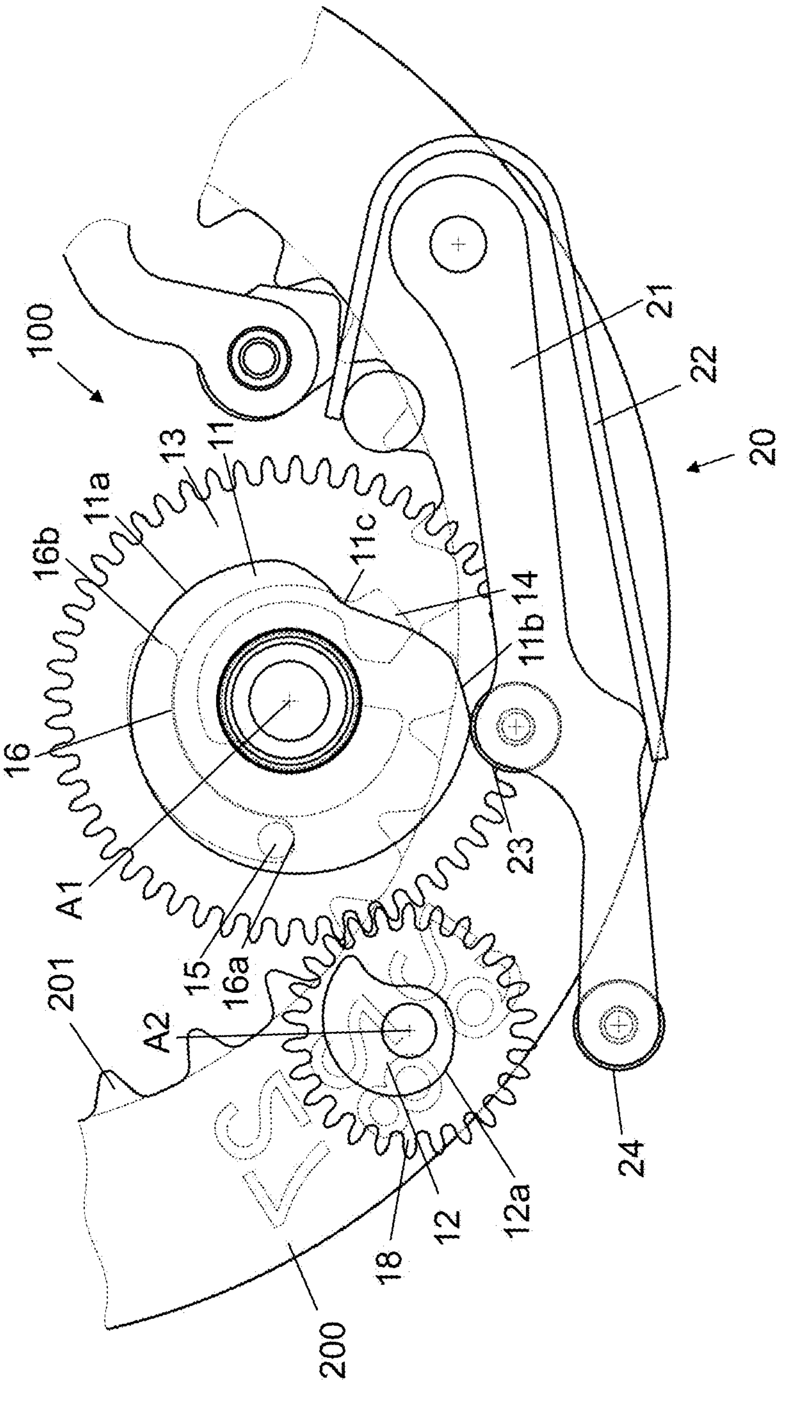
Figure 13:
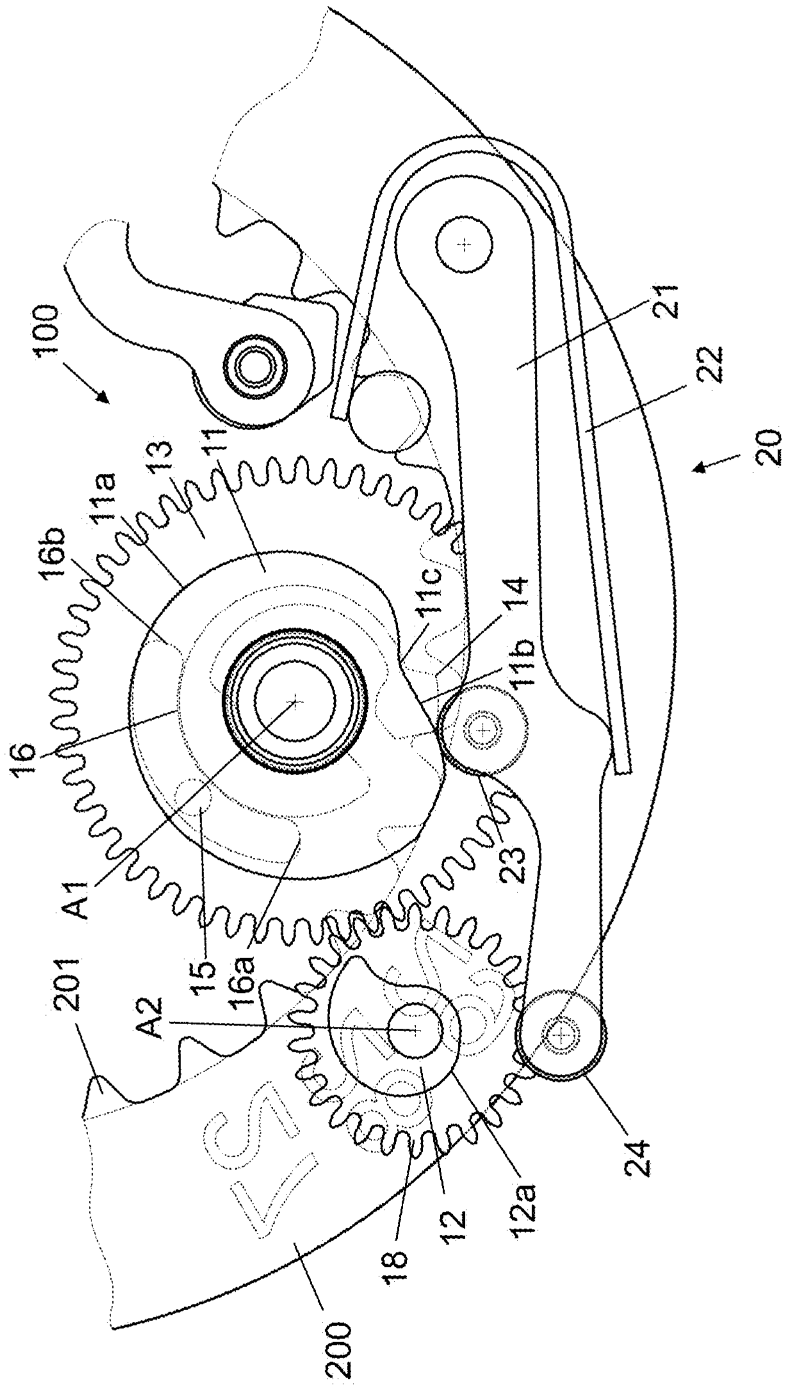
Figure 14:
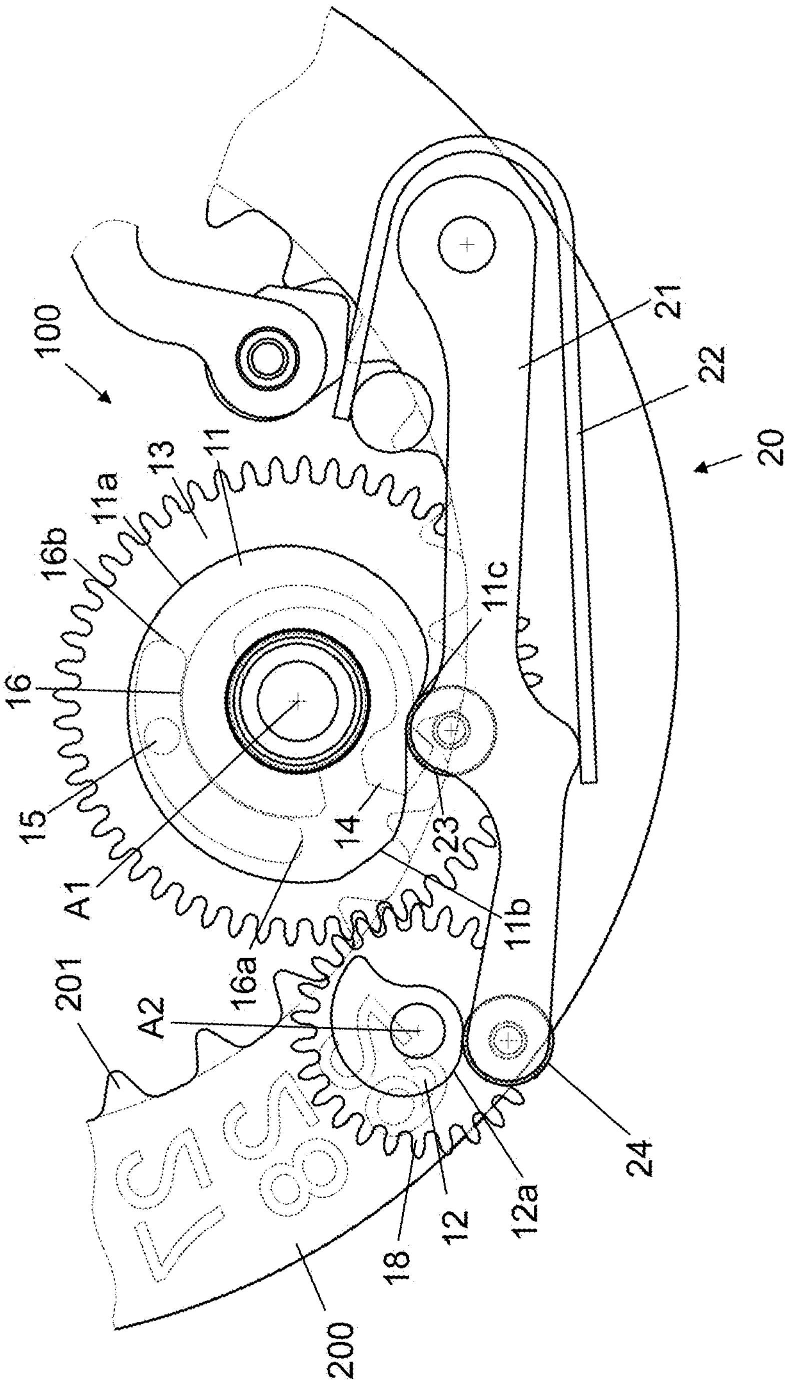
Figure 15:
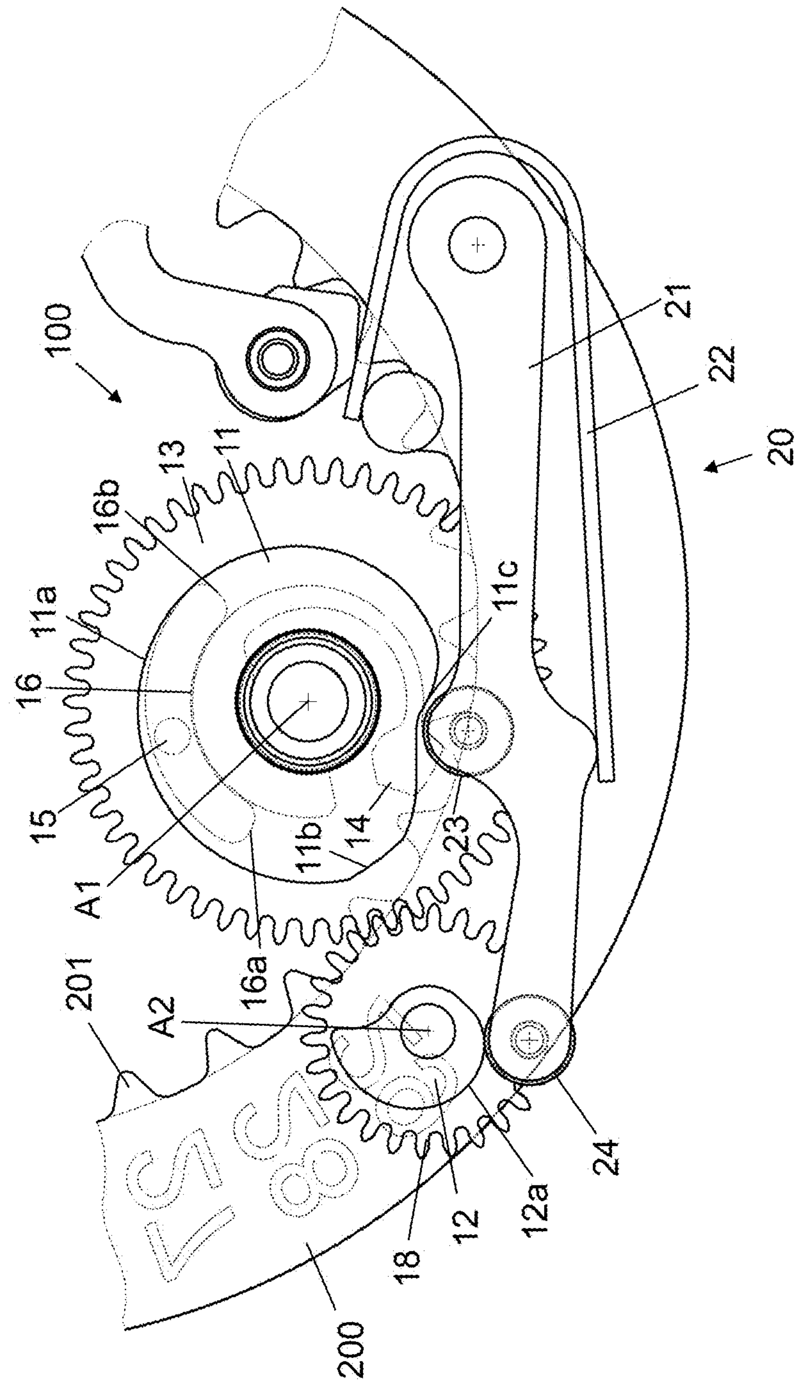
Figure 16:
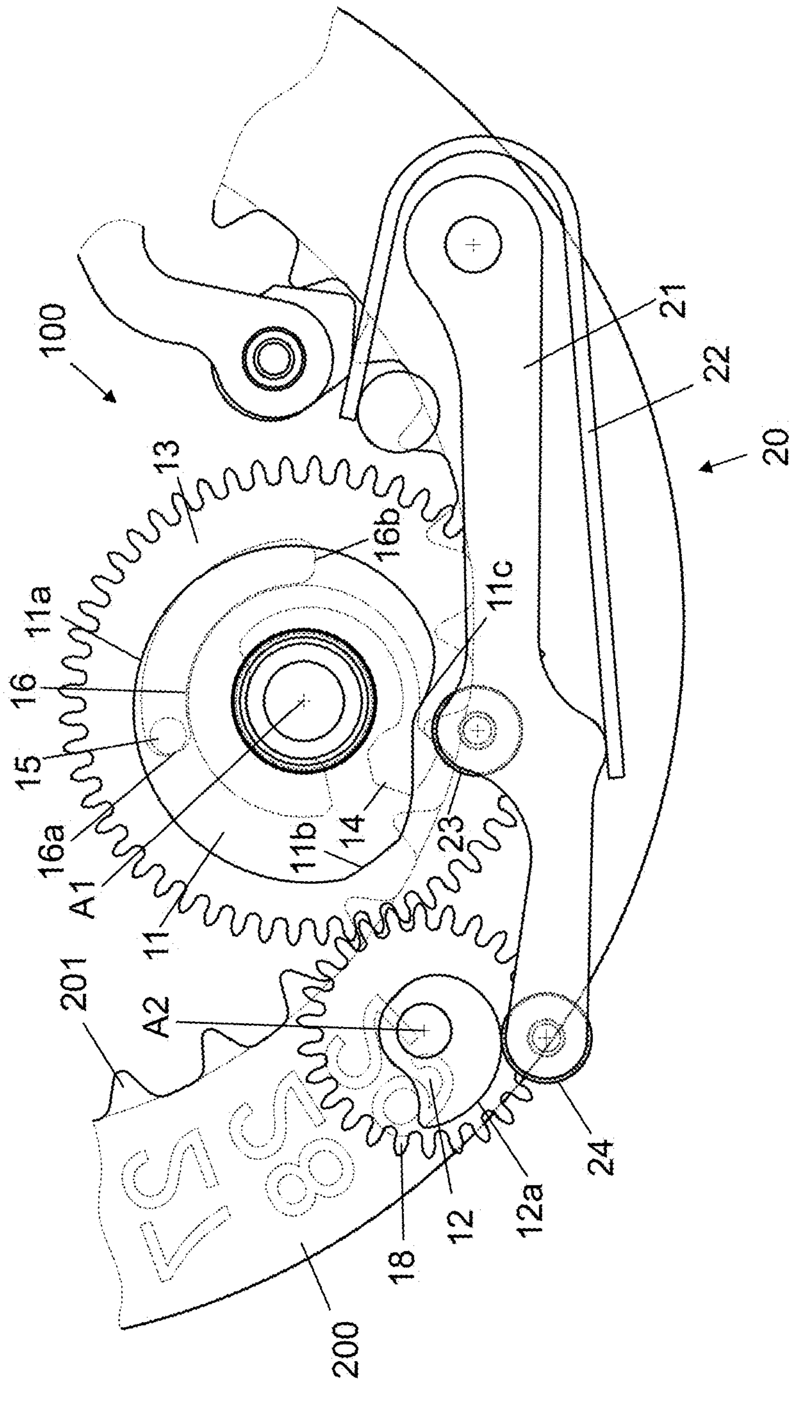
Figure 17:
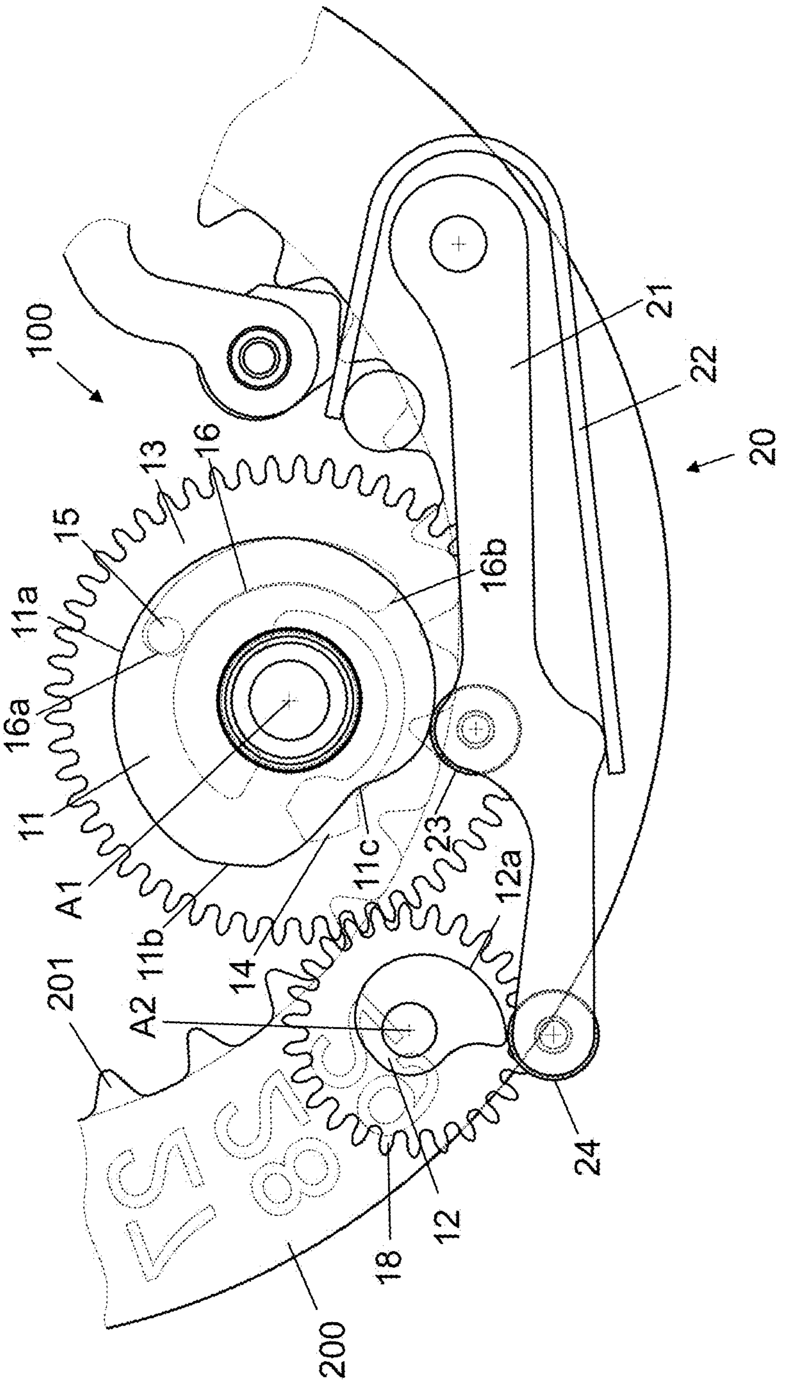

Furthermore, as depicted in FIGS. 9 and 10, the pre-cocking portion of the profile 12*a* is preferably sized so as to espouse the cocking portion 11*a* at the end of the compensation phase in order for the transition of the roller 23 from the pre-cocking portion of the profile 12*a* to the cocking portion 11*a* to be as continuous as possible, without sudden interruption or significant disturbance, where the cocking torque observed at the level of the input mobile 13 is concerned and therefore where energy consumption is concerned.

The return portion 11*b* of the profile of the main cam 11 extends over a first angular portion corresponding to the travel necessary for the second mobile to drive the calendar system 300. The angular portion 11*b* is complementary to the sum of the angular portions of the cocking portion 11*a* and the stop portion 11*c*.

The pre-cocking portion of the profile 12*a* of the auxiliary cam 12 enables the first cocking of the energy accumulation device 20 to extend over a second angular portion at least equal to or at least substantially equal to the first angular portion of the return portion 11*b*.

Consequently, the cocking portion 11*a* of the profile of the main cam 11 enabling a second cocking of the energy accumulation device 20 extends over a third angular portion complementary to the second angular portion. Alternatively, the third angular portion may be of zero or substantially zero length in the situation where the pre-cocking portion of the profile 12*a* is adapted to enable complete cocking of the energy accumulation device 20.

The sum of the second and third angular portions is advantageously equal to the angle that the input mobile 13 travels over the whole or substantially the whole of the period of rotation.

In other words, during the compensation phase, the follower 21 leaves the main cam profile 11 and instead starts to follow the auxiliary cam profile 12, thus pre-cocking the spring 22. This has the effect of smoothing the load on the input mobile. During the compensation phase, the main cam is not driven. The main cam does not drive another element.

Accordingly, one method of executing the method of operating the timepiece 500 or the timepiece movement 400 or the timepiece calendar 300 or the timepiece driving the device 100 includes at least one iteration and preferably a plurality of iterations of the following steps:

- driving of the main cam 11 by action of the energy accumulator 22 on the main cam via the cam follower 21, then
- accumulation of energy in the energy accumulator 22 by action of the auxiliary cam 12 on the energy accumulator 22 via the cam follower 21.

The operating method as a whole or at least one iteration thereof may include accumulation of energy in the energy accumulator 22 by action of the main cam 11 on the energy accumulator 22 via the cam follower 21.

Accordingly:

- the main cam 11 is in driving mode because of the action of the energy accumulator 22 via the cam follower 21 over a first angular portion, and
- the auxiliary cam 12 supplies energy to the energy accumulator 22 via the cam follower over a second angular portion at least equal or at least substantially equal to the first angular portion, and
- the main cam 11 supplies energy to the energy accumulator 22 via the cam follower over a third angular portion that is i) complementary to the second angular portion and/or ii) of zero or substantially zero length.

The driving of the main cam 11 during the driving phase is preferably instantaneous driving.

Of course, the present solution is not limited to a single calendar date system but is also particularly suitable for calendar systems necessitating for example more energy than an annual date calendar or a perpetual date calendar. Furthermore, a timepiece driving device in accordance with the invention may be used for a system for displaying time information or information derived from the time (thus derived from the oscillator), in particular information distinct from calendar information. The timepiece driving device may in particular be used in a system for displaying the time (with a jumping display) or the phases of the Moon.

The first and second mobiles of the driving device need not be coaxial but could pivot about two preferably separate and parallel axes. They would then be connected by gears, for example. The main cam 11 and the auxiliary cam 12 can therefore pivot about separate axes, in particular about parallel axes.

Thus, a second embodiment of a timepiece 500 is described in detail hereinafter with reference to FIGS. 11 to 17 (similar to FIGS. 4 to 10 that relate to the first embodiment).

The timepiece 500 is for example a watch, in particular a wristwatch. The timepiece 500 includes a timepiece movement 400 intended to be mounted in a timepiece case in order to protect it from the external environment.

The timepiece movement 400 is a mechanical movement, in particular an automatic movement, or a hybrid movement or an electronic movement.

The timepiece movement 400 includes a timepiece calendar 300.

The timepiece calendar 300 includes:

- at least one display member 200, in particular a date display member, in particular a date display disc, and
- a timepiece driving device 100, the at least one display member 200 and the driving device 100 being such that the driving device 100 is able to drive the at least one display member 200. The driving is of the instantaneous driving or instantaneous jump type.

The calendar system 300 enables display via the at least one display member 200 of at least one calendar indication such as a day indication, a date indication, a month indication, a year indication, a bissextile year indication, a phase of the Moon indication.

The at least one calendar indication may be carried by the at least one display member 200 such as a hand or a disc.

The timepiece driving device 100 includes:

an input mobile 13;

a main cam 11 having a main cam profile 11*a*, 11*b*, 11*c*, the main cam 11 being connected to the input mobile (i) with angular backlash or (ii) via a unidirectional coupling;

an auxiliary cam 12 connected to the input mobile, in particular fixed onto the input mobile or secured to the input mobile, and having an auxiliary cam profile 12*a*, a cam follower 21 adapted to cooperate with the profile 11*a*, 11*b*, 11*c* and/or with the profile 12*a*, and an energy accumulator 22 elastically biasing the cam follower 21 toward the profile 11*a*, 11*b*, 11*c* of the main cam 11 and toward the profile 12*a* of the auxiliary cam 12.

The first and second wheels of the drive device are not coaxial, but rotated on two separate axis, preferably parallel. They are then connected, for example, by a gear. This allows the main cam 11 and auxiliary cam 12 to be rotated about separate axis, especially around parallel axes.

The auxiliary cam 12 rotates along an axis A2 parallel to the axis A1 and is attached to a wheel 18 which is cinematically linked or is cinematically attached to the driving wheel 13 by a gear.

The stud 15 of the disconnecting device is capable of cooperating with the angular stops 16*a* and 16*b* arranged at the ends of the groove 16 machined on the driving wheel 13

The auxiliary cam 12 has the profile 12*a* including a pre-cocking portion capable of cooperating with the energy accumulation device 20, during the compensation phase. Of course, the sizing of the angular extent of the pre-cocking portion of the profile 12*a* must take into account the transmission ratio between the main cam 11 and the auxiliary cam 12, more particularly between the drive wheel 13 and a wheel 18. For example, with a gear ratio of 2, the angular extent of the pre-cocking portion of profile 12*a* should be twice as high as the angular portion corresponding to the travel required for the second mobile to drive the calendar system 300. In other words, with the second embodiment represented, the pre-cocking portion of the auxiliary cam profile 12*a* allowing the first cocking of the energy accumulation device 20 can extend along a second angular portion at least 2 times greater or at least substantially 2 times greater than the first angular portion of the return portion 11*b*.

The cam follower 21 includes a second portion or more particularly a second bearing, such as a second stone or a ruby roller 24, which can cooperate with the auxiliary cam profile 12.

Regardless of the embodiment or the variant the decoupling device could be a unidirectional connecting device such as a freewheel in which the portion 15 would for example be a portion of a ratchet intended to cooperate with the angular abutment 16*a*.

Regardless of the embodiment or the variant the stud 15 could be on the first mobile, for example on the auxiliary cam 12 or the input mobile 13, and the groove 16 could consequently be on the second mobile, for example on the main cam 11.

In the embodiment described above a roller 23 constitutes a unique bearing element enabling (sequential) cooperation through contact with the main cam 11 and with the auxiliary cam 12. Nevertheless, regardless of the embodiment or the variant the cam follower may include:

a first element bearing on the main cam 11, and a second element bearing on the auxiliary cam 12.

Thus the first bearing element may be intended to cooperate exclusively with the main cam 11 and the second bearing element may be intended to cooperate exclusively with the auxiliary cam 12.

In the above description the calendar system 300 is driven by at least one step for each period of rotation of the input mobile 13. Nevertheless, regardless of the embodiment or the variant the instantaneous driving device could be adapted to drive the calendar system on each multiple or each sub-multiple of the period of rotation of the input mobile 13. Of course, the geometries of the main and auxiliary cams could be designed accordingly.

Regardless of the embodiment or the variant the auxiliary cam 12 enables at least partial cocking of the energy accumulator 22. The auxiliary cam 12 may be used to carry out a first cocking of the energy accumulator 22 and the main cam 11 can be used to carry out a second cocking of the energy accumulator 22 complementary to the first cocking. Alternatively, the auxiliary cam 12 may be used to carry out complete cocking of the energy accumulator 22 by adapting the pre-cocking portion of the profile 12*a*. In this hypothesis the cocking portion 11*a* is superfluous and the only function of the main cam 11 is to cooperate with the follower 21 to transmit the energy returned by the energy accumulator thanks to the return portion 11*b* and potentially to dissipate the residual kinetic energy after the display member 200 is driven by the stop portion 11*c*.

Regardless of the embodiment or the variant the auxiliary cam 12 could actuate the energy accumulation device 20 via a portion of the lever 21 other than that adapted to cooperate with the main cam 11.

Regardless of the embodiment or the variant the term "cam" has a broad meaning and encompasses any geometry cooperating with a cam follower. In particular, a pin cooperating with a cam follower is a cam.

For example, the auxiliary cam 12 could take the form of a portion or of a pin excentric relative to the rotation axis adapted to cooperate with a portion of the lever 21. The shape of the profile of said portion of the lever 21 with said pin would preferably be designed so as to enable cocking with a constant torque at the input mobile 13.

More generally the main and auxiliary cams could have simple geometries, such as pins, cooperating with one or more appropriate profiles on the lever 21 of the energy accumulation device.

The solutions described above exploit two calendar cams, in particular superposed calendar cams, that advantageously enable smooth and limited variations of power consumption over 24 hours. More generally, the proposed solutions advantageously make it possible to smooth the mechanical cocking power throughout the period of rotation of the input mobile 13 with the exception of the instantaneous driving phase. Consequently, the power consumed and therefore the amplitude losses of the balance can be constant, in contrast to the solutions known from the prior art.

Furthermore, given that the energy necessary for the instantaneous driving of the display member can be accumulated over a period of rotation greater than those of the known solutions, it is also possible to minimize the mechanical cocking power for the same total quantity of energy accumulated. By increasing the cocking period from 13 hours to 24 hours it is for example possible to reduce the cocking power by 46%. By increasing the cocking time from 20 hours to 24 hours it is for example possible to reduce the cocking power by 17%.

The instantaneous driving device 100 advantageously enables direct driving of the display member 200 using a single and unique driving element 14. In fact the solution does not necessitate a lever at the interface of said members.

This shaping advantageously enables bidirectional driving of the display member 200. In fact, thanks to the decoupling device in the form of a portion 15 cooperating with a groove 16, the embodiments described also enable driving of the display member 200 by actuation of the input mobile 13 in the opposite operating direction, for example when setting the time on the timepiece movement 400.

Throughout this application by "instantaneous" is preferably meant a duration of the order of one or more fractions of a second.

The invention claimed is:

1. A timepiece driving device, including:

an input mobile;

a main cam having a main cam profile, the main cam being connected to the input mobile (i) with angular backlash or (ii) via a unidirectional coupling;

an auxiliary cam connected to the input mobile, and having an auxiliary cam profile, a cam follower adapted to cooperate with the main cam profile and/or with the auxiliary cam profile, and an energy accumulator elastically biasing the cam follower toward the main cam profile and toward the auxiliary cam profile, wherein the timepiece driving device, is arranged so that the cam follower comes into contact or substantially into contact with the auxiliary cam profile immediately at an end of a driving of the main cam by action of the energy accumulator on the main cam via the cam follower.

2. The timepiece driving device as claimed in claim 1, wherein the timepiece driving device, is adapted so as to cock the energy accumulator via the cam follower over substantially a totality of a period of rotation of the input mobile, except a driving phase in which the main cam is in driving mode.

3. The timepiece driving device as claimed in claim 2, wherein the timepiece driving device is adapted so as to cock the energy accumulator via the cam follower over a period of 24 hours, except a driving phase in which the main cam is in driving mode.

4. The timepiece driving device as claimed in claim 1, wherein the main cam and the auxiliary cam pivot about a same axis.

5. The timepiece driving device as claimed in claim 1, wherein the main cam and the auxiliary cam pivot about different axes.

6. The timepiece driving device as claimed in claim 5, wherein the the main cam and the auxiliary cam pivot about parallel axes.

7. The timepiece driving device as claimed in claim 1, wherein the driving device is so that:

the main cam is in driving mode by an action of the energy accumulator via the cam follower over a first angular portion, and the auxiliary cam supplies energy to the energy accumulator via the cam follower over a second angular portion at least equal to or at least substantially equal to the first angular portion, and the main cam supplies energy to the energy accumulator via the cam follower over a third angular portion that is (i) complementary to the second angular portion and/or (ii) zero or substantially zero.

8. The timepiece driving device as claimed in claim 1, wherein the driving device is so that a mechanical power supplied to the energy accumulator is constant or substantially constant throughout a time for which the main cam is not driven by the energy accumulator via the cam follower.

9. The timepiece driving device as claimed in claim 1, wherein the cam follower comprises a lever.

10. The timepiece driving device as claimed in claim 1, wherein the energy accumulator comprises a spring.

11. The timepiece driving device as claimed in claim 10, wherein the spring is a leaf spring.

12. The timepiece driving device as claimed in claim 1, wherein the main cam is kinematically connected to a driving element of an element for displaying time information cooperating with teeth of an element for displaying time information.

13. A timepiece calendar including:

the timepiece driving device as claimed in claim 1, and an element for displaying time information.

14. A timepiece movement including the timepiece calendar as claimed in claim 13.

15. A timepiece including the timepiece movement as claimed in claim 14.

16. A method of operating the timepiece driving device as claimed in claim 1, the method including at least one iteration of the following:

driving the main cam by action of the energy accumulator on the main cam via the cam follower, then accumulating energy in the energy accumulator by action of the auxiliary cam on the energy accumulator via the cam follower.

17. The operating method as claimed in claim 16, wherein the method includes accumulating energy in the energy accumulator by action of the main cam on the energy accumulator via the cam follower.

18. The operating method as claimed in claim 17, wherein the driving of the main cam is instantaneous driving.

19. The operating method as claimed in claim 13, wherein the driving of the main cam is instantaneous driving.

20. The timepiece driving device as claimed in claim 1, wherein the auxiliary cam is fixed onto or secured to the input mobile.

* * * * *